United States Patent

Shaffer

[15] 3,691,863

[45] Sept. 19, 1972

[54] CONTROL FOR HYDROSTATIC TRANSMISSION

[72] Inventor: Walter M. Shaffer, Chesterland, Ohio

[73] Assignee: Towmotor Corporation, Cleveland, Ohio

[22] Filed: April 28, 1971

[21] Appl. No.: 138,100

[52] U.S. Cl. ..........................74/478, 74/872, 60/19, 192/.098
[51] Int. Cl. ..............................................G05g 9/00
[58] Field of Search .....74/872, 478; 60/19; 192/.098

[56] References Cited

UNITED STATES PATENTS

| | | | |
|---|---|---|---|
| 3,247,669 | 4/1966 | Hann | 60/19 |
| 3,386,523 | 6/1968 | Ruhl | 192/.098 |
| 3,500,633 | 3/1970 | Livezey | 60/19 |
| 3,608,399 | 9/1971 | Knight | 192/.098 |

Primary Examiner—C. J. Husar
Attorney—Fryer, Tjensvold, Feix, Phillips & Lempio

[57] ABSTRACT

A control arrangement particularly for the hydrostatic transmission of a lift truck or the like to provide direction control, pump displacement control, throttle control, as well as special displacement control such as inching or creeping with high engine speeds as are required for lifting, etc. The arrangement includes a reciprocably movable pump displacement control rod coupled to a transmission control lever rotatable from a neutral position to forward and reverse pump displacement positions responsive to translation of the rod in opposite directions. Forward and reverse control linkage means are coupled to the rod by means of spring loaded sliders preloaded to a force above that required for the rod to move the transmission control lever through its full travel in both the forward and reverse directions in response to reciprocal rod movement effected by the control linkage means. A throttle control linkage is operably associated with the forward and reverse control linkage means to open the throttle in accordance with the extent of actuation of the latter control linkage means in either the forward or reverse direction. In addition, override control linkage means are coupled to the rod to override the loading force of the sliders and cause the rod to move the transmission control lever towards its neutral position irrespective of actuation of the forward and reverse control linkage means.

17 Claims, 3 Drawing Figures

PATENTED SEP 19 1972    3,691,863
SHEET 1 OF 3
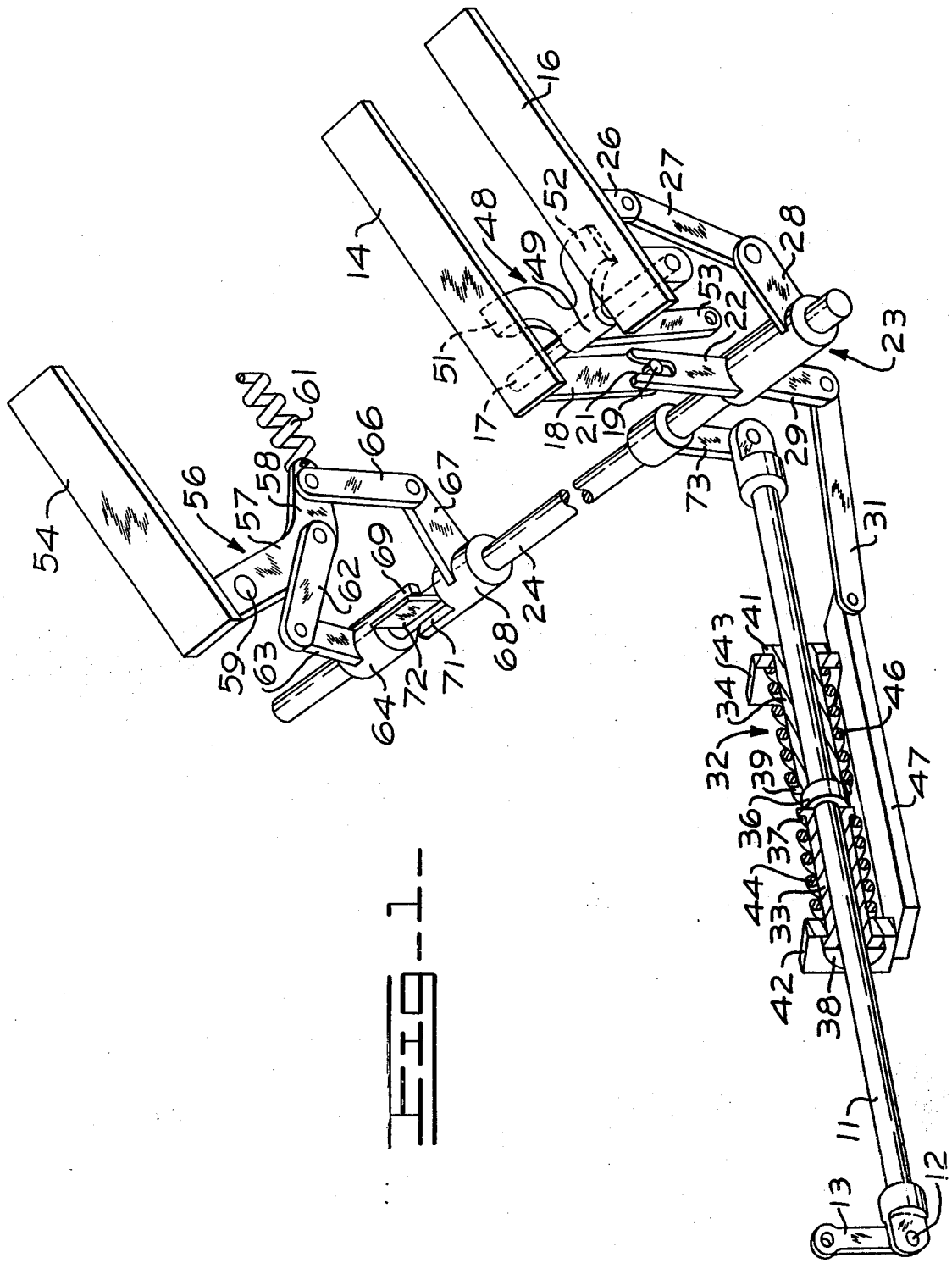
INVENTOR
WALTER M. SHAFFER
BY
*Fryer, Tjensvold, Feix, Phillips & Lempio*
ATTORNEYS

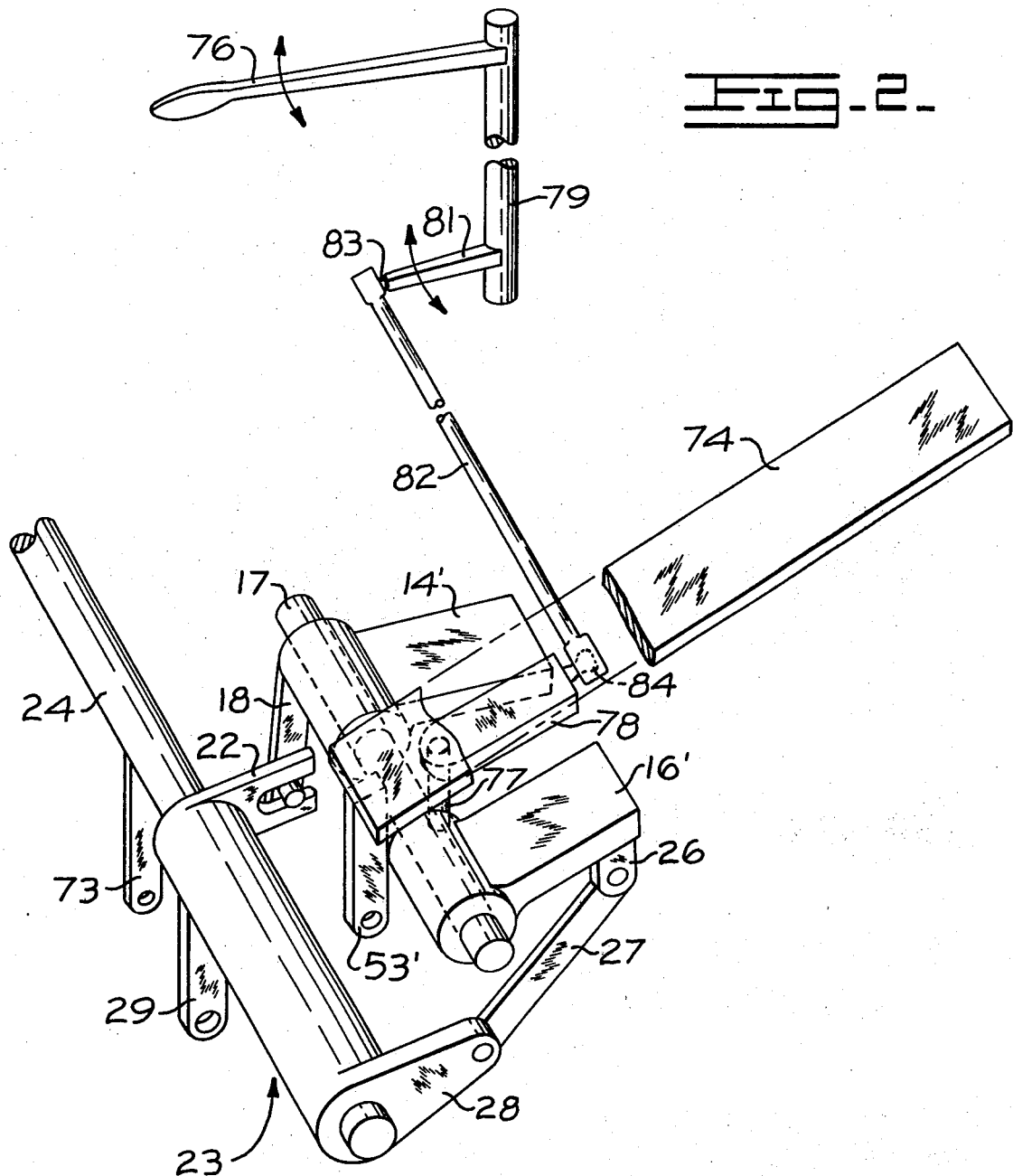

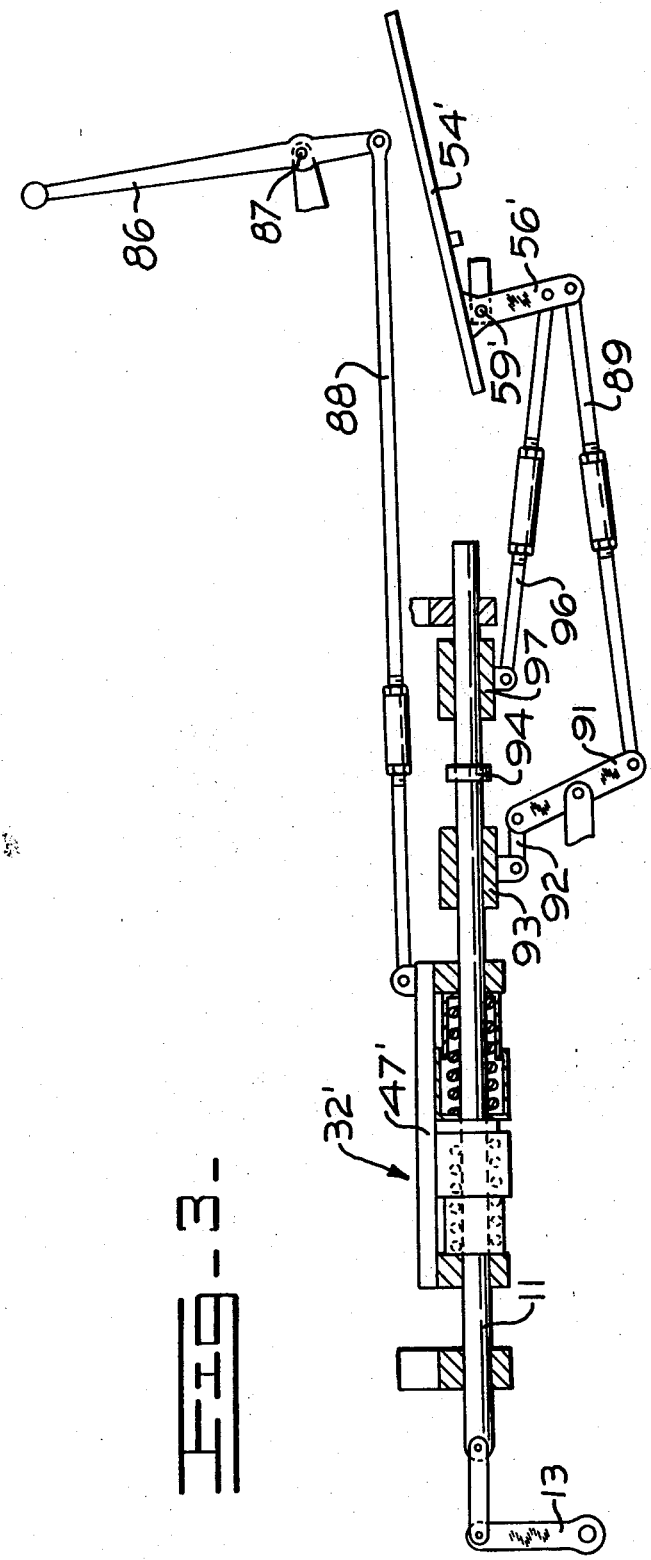

3,691,863

CONTROL FOR HYDROSTATIC TRANSMISSION

BACKGROUND OF THE INVENTION

With a lift truck or the like equipped with a hydrostatic transmission it is desirable that a control arrangement be provided which will enable the operator to maintain the vehicle in motion in both forward and reverse directions without causing cramping of muscles or fatigue after extended service, and which may be easily operated in the reverse direction with the operator turned in his seat.

The control arrangement should be such as to be instantly understood to enable an average operator to become proficient in its use within several minutes of his first exposure to same. In addition the control arrangement should facilitate special displacement control such as inching or creeping while the engine is operating at the high speeds required for lifting or the like.

SUMMARY OF THE INVENTION

The general object of the present invention is to provide an improved transmission control arrangement, particularly for a hydrostatic transmission, for providing direction control, pump displacement control, throttle control, as well as pump displacement override control in special displacement situations, such as inching or creeping, while maintaining high engine speeds.

As an important feature of the invention, the control arrangement is such as to be instantly understood in its operation and to enable the operator to accomplish the control functions without cramping of muscles or fatigue, as well as in the reverse direction with the operator turned in his seat.

In the accomplishment of the foregoing and other objects and features, a control arrangement in accordance with the present invention generally comprises a reciprocably movable control rod coupled to a transmission control lever rotatable from a neutral position to forward and reverse pump displacement positions responsive to translation of the rod in opposite directions. Such rod movement is effected by forward and reverse control linkage means coupled thereto by means of spring loaded sliders preloaded to a force above that required for the rod to move the lever through its full rotational travel in both the forward and reverse directions.

A throttle control linkage is operably associated with the forward and reverse control linkage means to open the throttle in accordance with the extent of actuation of the latter linkage means in either the forward or reverse directions. Override control linkage means are coupled to the rod to override the loading force of the slide collars and translate the rod to rotate the lever towards its neutral position irrespective of actuation of the forward and reverse control linkage means.

In a preferred embodiment of the control arrangement, the forward and reverse control linkage means include forward and reverse foot pedals depressible by one foot of the operator and the override control linkage means includes an override foot pedal depressible by the other foot of the operator. The foot pedals are coupled to a common cross shaft in turn coupled to the rod to effect reciprocable translation thereof.

In another embodiment of the control arrangement, the forward and reverse control linkage means include a single pump displacement control foot pedal and an associated hand lever operated forward and reverse direction selector linkage.

In a further embodiment of the control arrangement, the forward and reverse control linkage means include a hand operated forward and reverse displacement control lever.

BRIEF DESCRIPTION OF THE DRAWINGS

FIG. 1 is a perspective view of a preferred embodiment of control arrangement in accordance with the present invention.

FIG. 2 is a fragmentary perspective view of a modified form of the control arrangement.

FIG. 3 is a side elevational view with portions broken away of a further embodiment of the control arrangement.

Referring now to FIG. 1 in detail, a transmission control arrangement in accordance with the present invention will be seen to include a reciprocably movable control rod 11 having an end pivotally connected, as indicated at 12, to a rotary transmission control lever 13 associated with a hydrostatic transmission (not shown) of a lift truck or the like. Counterclockwise rotation of the lever from a neutral position depicted in FIG. 1 corresponds to forward pump displacement control of the transmission. Conversely, clockwise rotation of the lever from neutral position corresponds to reverse pump displacement control. Thus, forward displacement control is derived by translation of the rod 11 towards the right, as viewed in FIG. 1, while reverse displacement control is derived by translation of the rod towards the left.

Forward and reverse control linkage means are associated with the rod 11 to enable the operator to conveniently effect the above-noted rightward and leftward translation thereof productive of forward and reverse rotation of transmission lever 13. In the instant embodiment, such control linkage means include forward and reverse foot pedals 14 and 16 positioned for selective depression by one foot of the operator and appropriately coupled to the rod in such a manner that depression of forward pedal 14 produces rightward translation of the rod while depression of reverse pedal 16 produces leftward translation thereof.

More particularly, the pedals are preferably mounted adjacent one end for juxtaposed pivotal movement about a fixed shaft 17, the pedals projecting forwardly therefrom so as to be pivoted clockwise upon depression. An arm 18 depends from the forward pedal at a point rearwardly displaced from its pivot, and such arm has a laterally projecting pin 19 at its free end. The pin engages a slot 21 formed in the free end of an upwardly projecting arm 22 of a bell crank 23 mounted for rotation about a cross shaft 24.

The reverse pedal 16, on the other hand, is provided with a depending arm 26 forwardly displaced from its pivot. The free end of such arm is pivotally connected to one end of a link 27, the opposite end of which is pivotally connected to the free end of a second arm 28 of bell crank 23 angularly offset in the clockwise direction from arm 22. It will be thus appreciated that depression of forward pedal 14 produces counterclockwise pivotal movement of the bell crank about cross shaft 24. Depression of the reverse pedal 16 produces clockwise pivotal movement of the bell crank.

Bell crank 23 is provided with a third arm 29 projecting oppositely to arm 22, the free end of arm 29 being pivotally connected to a link 31 which is in turn coupled to rod 11 such that counterclockwise and clockwise movements of the bell crank respectively effect rightward and leftward translation of the rod.

Although link 31 may be variously coupled to the rod, an indirect coupling mechanism 32 is preferably employed for this purpose for reasons subsequently described. Such mechanism 32 preferably includes a pair of tubular spring retainers 33 and 34 slidably mounted on the rod on opposite sides of an intermediate fixed collar 36 thereof. The proximal and distal ends of the retainers 33 and 34 with respect to the collar are respectively formed with outwardly flared annular flanges 37, 38 and 39, 41. Sliders 42 and 43 are respectively coaxially slidably disposed upon retainers 33 and 34 adjacent their distal flanges 38 and 41, while compression springs 44 and 46 are coaxially disposed about the retainers to act between their proximal flanges 37 and 39 and sliders 42 and 43.

The sliders are tied together as by means of a bridge plate 47 so as to be unitarily movable. The free end of link 31 is pivotally connected to the bridge plate to thereby couple the bell crank 23 to the sliders 42 and 43. Compression springs 44 and 46 are preloaded to a force greater than that required for rod 11 to move transmission lever 13 through its full rotational travel between forward and reverse pump displacement positions. As a result the coupling mechanism 32 is normally rigid such that the pivotal movements of the bell crank responsive to depressions of the forward and reverse foot pedals 14 and 16 effect reciprocable translation of the rod to move the transmission lever through its full rotational travel.

In order to provide throttle control of the vehicle in conjunction with the previously noted forward and reverse control of transmission pump displacement, suitable throttle control linkage means are preferably associated with the forward and reverse foot pedals 14 and 16. More particularly, the throttle control linkage means preferably comprises a wishbone shaped member 48 having a collar 49 pivotally mounted upon shaft 17 and a pair of wings 51 and 52 oppositely laterally projecting from the collar subjacent pedals 14 and 16.

The wings engage the undersides of the pedals such that when either one thereof is depressed the member 48 is pivoted clockwise about shaft 17. A lever 53 depending from collar 49 is adapted for connection to throttle actuating linkage (not shown) which is arranged to open the throttle in accordance with the extent of pivotal movement of member 48, and thus the amount of depression of either of the pedals 14 and 16. Thus, throttle control is achieved concurrently with forward and reverse pump displacement control responsive to depression of the forward and reverse pedals.

The control arrangement of the present invention further includes override control linkage means for translating rod 11 in a direction to return transmission lever 13 towards its neutral position irrespective of either of the pedals 14 and 16 being depressed to normally rotate the lever to a forward or reverse displacement position. Such override control is of importance for special displacement situations such as inching or creeping while high engine speeds are maintained by one of the pedals being depressed to open the throttle.

In the instant embodiment, the override control linkage means include an override control pedal 54 positioned for depression by the opposite foot of the operator from that used to depress the forward and reverse pedals 14 and 16. More particularly, a dog-leg shaped arm 56 depends from the rearward end of pedal 54, the arm including a straight portion 57 projecting right-angularly downward from the pedal and an arcuate portion 58 forwardly turned from the straight portion. The straight portion 57 is rotatable about a fixed pivot 59 such that depression of the forward end of the pedal effects clockwise pivotal movement of arm 56.

The free end of arcuate portion 58 is loaded as by means of a spring 61 which acts to resiliently retain the pedal in undepressed position. One end of a link 62 is pivotally connected to arm 56 adjacent the intersection of the straight and arcuate portions thereof, and the opposite end of the link is pivotally connected to an arm 63 which integrally projects radially from a collar 64 rotatable about cross shaft 24. One end of a link 66 is pivotally connected to the arcuate portion 58 of arm 56, while the opposite end of link 66 is pivotally connected to an arm 67 which integrally projects radially from a collar 68 rotatable about cross shaft 24 at a position coaxially spaced from collar 64.

Collars 64 and 68 are respectively provided with integral longitudinal fingers 69 and 71 projecting oppositely from the facing ends thereof. The fingers project from points adjacent the peripheries of the collars circumferentially displaced substantially 180° apart when the pedal 54 is in undepressed position. The fingers 69 and 71 are on opposite sides of an integral block 72 which projects radially from the cross shaft 24. The cross shaft is further provided with an integral radial arm 73 pivotally connected to the distal end of rod 11 with respect to transmission lever 13.

With the override control linkage provided in the manner physically described hereinbefore, it will be appreciated that depression of pedal 54 results in opposite directional rotation of collars 64 and 68, causing fingers 69 and 71 to engage the opposite sides of block 72. This effects rotation of cross shaft 24 and integral arm 73 thereof in a direction to cause rod 11 to override whichever one of springs 44 or 46 is compressed by depression of one of the displacement control foot pedals 14 and 16.

In the event forward foot pedal 14 is depressed, spring 44 is compressed by the rightward movement of slider 42. The rod 11 is moved to the right to resiliently pivot cross shaft 24 counterclockwise through arm 73. Under such conditions, depression of override pedal 54 effects positive clockwise rotation of shaft 24 against the resilient holding force of spring 44 to thereby override same and translate rod 11 to the left such that transmission lever 13 approaches its neutral position.

Conversely, when reverse foot pedal 16 is depressed, spring 46 is compressed by the leftward movement of slider 43 and rod 11 is moved to the left to resiliently pivot cross shaft 24 clockwise. Depression of override pedal 54 now effects positive counterclockwise rotation of shaft 24 against the resilient holding force of spring 46. The spring force is thus overriden and rod 11 is translated to the right such that transmission lever 13 approaches its neutral position.

Referring now to FIG. 2 in detail, there is shown a modified form of control arrangement in accordance with the present invention which is generally similar to that of FIG. 1 except that a single displacement control foot pedal 74 in conjunction with a hand operated direction selector control lever 76 are provided in place of the forward and reverse displacement control foot pedals 14 and 16 of the previously described embodiment.

More particularly, in the present arrangement, stub pedals 14' and 16' are pivotally mounted on shaft 17 and coupled to bell crank 23 in the same manner as the foot pedals 14 and 16. Hence the stub pedals function in the same manner as the foot pedals of the embodiment of FIG. 1. The displacement control foot pedal 74 is mounted at its rear end for pivotal movement about shaft 17 at a position intermediate the stub pedals 14' and 16'. The foot pedal projects forwardly from the shaft such that depression of the pedal effects clockwise pivotal movement thereof. A pivot pin 77 depends from the underside of pedal 74, and a plate 78 disposed subjacent the pedal is mounted for rotation about the pin between oppositely laterally projecting positions respectively overlying stub pedal 14' and stub pedal 16'.

The direction selector control lever 76 projects radially from a vertical rotary shaft 79, and a radial arm 81 of the shaft is coupled by means of a tie rod 82 to the free end of rotary plate 78. Connection between the opposite ends of the tie rod and the arm and plate are preferably facilitated by means of ball joints 83 and 84.

It is to be noted that a throttle control arm 53' depends from the rear of pedal 74 to facilitate throttle control in a manner analogous to that of arm 53 of wishbone member 48 of the embodiment of FIG. 1. In addition, although not shown in FIG. 2, it is to be understood that the override control pedal 54 is still associated with cross shaft 24 in the manner previously described. Thus, operation of the embodiment of FIG. 2 is the same as that of FIG. 1, except that forward displacement control is accomplished by turning lever 76 clockwise and depressing the single displacement control pedal 74, while reverse displacement control is accomplished by turning the lever counterclockwise and depressing the single pedal.

In this regard, clockwise rotation of the lever effects pivoting of the plate 78 to a position overlying stub pedal 14' such that depression of foot pedal 74 causes simultaneous depression of stub pedal 14'. Conversely, plate 78 is pivoted to a position overlying stub pedal 16' responsive to counterclockwise rotation of lever 76, whereby depression of foot pedal 74 effects depression of the latter stub pedal 16'.

FIG. 3 illustrates another alternative embodiment of control arrangement in accordance with the present invention which features a hand lever actuated forward and reverse displacement control in place of a foot pedal actuated control, and a modified form of override control.

More particularly, a vertical hand lever 86 is mounted at an intermediate point thereof for pivotal movement about a fixed transverse pivot 87 between a clockwise oriented forward displacement position and a counterclockwise oriented reverse displacement position, which positions are determined by detents, slots, or the like (not shown). A tie rod 88 couples the lower end of lever 86 to the bridge plate 47' of a coupling mechanism 32' carried by displacement control rod 11. The coupling mechanism 32' is generally similar to the coupling mechanism 32 of previous mention and functions in an analogous manner. Thus responsive to clockwise or forward movement of hand lever 86 to its forward position, rod 11 is translated to the left to thereby rotate transmission lever 13 clockwise to its forward displacement position. Conversely, responsive to counterclockwise or rearward movement of the hand lever to its reverse position, the rod is translated to the right to thereby rotate the transmission lever counterclockwise to its reverse displacement position.

Considering now the modified form of override control, it will be noted that same includes a foot pedal 54' having an arm 56' depending from its rearward end, the arm being mounted for rotation about a fixed transverse pivot 59' whereby depression of the pedal effects clockwise pivotal movement of the arm. The lower end of arm 56' is pivotally connected to one end of a tie rod 89, the other end of which is pivotally connected to one end of a centrally pivoted lever 91.

The opposite end of lever 91 is pivotally connected to one end of a link 92, the opposite end of which is pivotally connected to a slide collar 93 coaxially disposed on rod 11 to the left of a stop collar 94 thereof. Another tie rod 96 has its opposite ends respectively pivotally connected to the arm 56' at a point adjacent its lower end and to a second slide collar 97 coaxially disposed upon rod 11 to the right of stop collar 94. Thus, it will be seen that depression of the pedal 54' effects rightward translation of slide collar 93 and leftward translation of slide collar 97 towards stop collar 94.

When the rod 11 is translated to the left responsive to hand lever 86 being in its forward displacement position, stop collar 94 is engaged with the left slide collar 93. Hence, upon depression of foot pedal 54', slide collar 93 urges rod 11 to the right to override the spring loading force of coupling mechanism 32' and effect clockwise rotation of transmission lever 13 to approach its neutral position. Conversely, stop collar 94 is engaged with right slide collar 97 when rod 11 is translated to the right responsive to movement of lever 86 to its reverse position. Now upon depression of override foot pedal 54', slide collar 97 urges rod 11 to the left, overriding the spring loading force of coupling mechanism 32', and effecting counterclockwise rotation of transmission lever 13 towards its neutral position.

Although the invention has been hereinbefore described and illustrated in the accompanying drawings with respect to but several embodiments thereof, it will be appreciated that numerous modifications and changes may be made therein without departing from the true spirit and scope of the invention, and thus it is not intended to limit the invention except by the terms of the appended claims.

What is claimed is:

1. A transmission control arrangement comprising a reciprocably movable control rod having an end coupled to a transmission control lever oppositely rotatable from a neutral position to forward and reverse displacement positions responsive to translation of said rod in first and second opposite translational directions, a coupling mechanism carried by said rod including first and second spring loaded sliders respectively slidably movable along said rod in said first and second directions, said sliders being preloaded to forces greater than those required to rotate said transmission control lever between said forward and reverse displacement positions, forward and reverse displacement control linkage means coupled to said sliders for selectively effecting said translation of said rod in said first and second directions, and override control linkage means coupled to said rod for selectively overriding the preloaded force of said first slider when said displacement control linkage means translates said rod in said first direction while translating said rod in said second direction, and overriding the preloaded force of said second slider when said displacement control linkage means translates said rod in said second direction while translating said rod in said first direction.

2. A control arrangement according to claim 1, further defined by throttle control linkage means coupled to said displacement control linkage means for opening a throttle in accordance with actuation of said displacement control linkage means in either forward or reverse directions thereof.

3. A control arrangement according to claim 1, further defined by said displacement control linkage means including forward and reverse foot pedals and means coupling said foot pedals to said sliders for translation thereof in said first and second directions respectively in response to depression of said forward and reverse foot pedals.

4. A control arrangement according to claim 1, further defined by said displacement control linkage means including a displacement foot pedal, a direction selector lever having forward and reverse positions, and means coupling said foot pedal and said selector lever to said sliders for translation in said first direction responsive to said lever being in said forward position and depression of said pedal and translation in said second direction responsive to said lever being in said reverse position and depression of said pedal.

5. A control arrangement according to claim 1, further defined by said displacement control linkage means including a hand operable displacement control lever having forward and reverse positions, and means coupling said control lever to said sliders for translation in said first and second directions in response to movement of said lever to its forward and reverse positions.

6. A control arrangement according to claim 1, further defined by said coupling mechanism including a pair of compression springs coaxially disposed upon said rod on opposite sides of a stop collar thereof, said sliders being disposed on opposite sides of said collar with said springs oppositely acting between said collar and said sliders, and a bridge plate connecting said sliders, said displacement control linkage means being coupled to said bridge plate.

7. A control arrangement according to claim 3, further defined by said forward and reverse foot pedals being mounted for juxtaposed pivotal movement about a common fixed shaft responsive to depression of said pedals, said coupling means comprising a bell crank rotatable about a cross shaft, a first linkage coupling said forward pedal to said bell crank for rotation thereof in a first direction responsive to depression of said forward pedal, a second linkage coupling said reverse pedal to said bell crank for rotation thereof in an opposite second direction responsive to depression of said reverse pedal, and a third linkage coupling said bell crank to said sliders for translation in said first and second translational directions thereof responsive to rotation of said bell crank in said first and second rotational directions thereof.

8. A control arrangement according to claim 3, further defined by a rotatable member mounted for pivotal movement subjacent said pedals and having portions disposed for engagement by said pedals responsive to depression thereof to pivot said rotatable member, said member having an arm adapted for connection to throttle linkage for opening a throttle in accordance with pivotal movement of said rotatable member.

9. A control arrangement according to claim 7, further defined by said override control linkage means comprising an override control pedal mounted for pivotal movement in response to depression thereof, said override pedal having an arm depending therefrom for pivotal movement therewith, first and second collars mounted for rotation about said cross shaft at coaxially spaced positions thereof, said collars each having an integral arm projecting radially therefrom, said collars having longitudinal fingers projecting oppositely from the facing ends thereof, an integral block projecting radially from said cross shaft circumferentially intermediate said fingers, said fingers of said first and second collars being engageable with said block responsive to rotation of said first and second collars in mutually opposite directions, first and second links coupling said arms of said first and second collars to said arm of said override pedal for rotating said collars in mutually opposite directions responsive to depression of said override pedal, and an integral radial arm projecting from said cross shaft and pivotally connected to the distal end of said control rod with respect to said transmission lever.

10. A control arrangement according to claim 9, further defined by said coupling mechanism including a pair of compression springs coaxially disposed upon said control rod on opposite sides of a stop collar thereof, said sliders being disposed on opposite sides of said stop collar with said springs oppositely acting between said stop collar and said sliders, and a bridge plate interconnecting said sliders for unitary translation relative to said control rod, said third linkage being coupled to said bridge plate.

11. A control arrangement according to claim 10, further defined by a wishbone shaped member mounted for rotation about said fixed shaft intermediate said forward and reverse pedals, said member having oppositely laterally projecting wings respectively disposed subjacent said forward and reverse pedals, said wings being thereby engageable by said forward and reverse pedals upon depression thereof to pivot said member, said member having an arm adapted for connection to a throttle linkage for opening a throttle in accordance with pivotal movement of said member.

12. A control arrangement according to claim 4, further defined by said coupling means comprising first and second stub pedals mounted for juxtaposed pivotal movement about a common fixed shaft responsive to depression of said stub pedals, said displacement pedal being mounted intermediate said stub pedals for pivotal movement about said fixed shaft responsive to depression of said displacement pedal, said displacement pedal having a depending pivot pin, a selector plate mounted subjacent said displacement pedal for rotation about said pin between first and second oppositely laterally projecting positions respectively in overlying engagement with said first and second stub pedals, a vertical rotary shaft having said direction selector lever projecting radially therefrom, said vertical shaft having a radial arm, a tie rod coupling said arm of said vertical shaft to said selector plate to rotate same between said first and second positions thereof responsive to rotation of said selector lever between said forward and reverse positions thereof, a bell crank rotatable about a cross shaft, a first linkage coupling said first stub pedal to said bell crank for rotation thereof in a first rotary direction responsive to depression of said first stub pedal, a second linkage coupling said second stub pedal to said bell crank for rotation thereof in an opposite second rotary direction responsive to depression of said second stub pedal, and a third linkage coupling said bell crank to said sliders for translation thereof in said first and second translational directions responsive to rotation of said bell crank in said first and second rotational directions thereof.

13. A control arrangement according to claim 12, further defined by said override control linkage means comprising an override control pedal mounted for pivotal movement in response to depression thereof, said override pedal having an arm depending therefrom for pivotal movement therewith, first and second collars mounted for rotation about said cross shaft at coaxially spaced positions thereof, said collars each having an integral arm projecting radially therefrom, said collars having longitudinal fingers projecting oppositely from the facing ends thereof, an integral block projecting radially from said cross shaft circumferentially intermediate said fingers, said fingers of said first and second collars being engageable with said block responsive to rotation of said first and second collars in mutually opposite directions, first and second links coupling said arms of said first and second collars to said arm of said override pedal for rotating said collars in mutually opposite directions responsive to depression of said override pedal, and an integral radial arm projecting from said cross shaft and pivotally connected to the distal end of said control rod with respect to said transmission lever.

14. A control arrangement according to claim 13, further defined by said coupling mechanism including a pair of compression springs coaxially disposed upon said control rod on opposite sides of a stop collar thereof, said sliders being disposed on opposite sides of said stop collar with said springs oppositely acting between said stop collar and said sliders, and a bridge plate interconnecting said sliders for unitary translation relative to said control rod, said third linkage being coupled to said bridge plate.

15. A control arrangement according to claim 14, further defined by an arm depending from said displacement pedal adapted for connection to a throttle linkage for opening a throttle in accordance with depression of said displacement pedal.

16. A control arrangement according to claim 15, further defined by said override control linkage means comprising an override foot pedal mounted for pivotal movement in response to depression thereof, said pedal having an arm depending therefrom for pivotal movement therewith, first and second slide collars coaxially disposed on said control rod on opposite sides of a stop collar thereof, and first and second linkages respectively coupling said arm of said pedal to said first and second slide collars for movement thereof in said first and second opposite translational directions towards said stop collar responsive to pivotal movement of said lever.

17. A control arrangement according to claim 16, further defined by said first linkage comprising a centrally pivoted lever, a tie rod coupling said arm of said pedal to a first end of said centrally pivoted lever, and a link coupling the second opposite end of said centrally pivoted lever to said first slide collar, said second linkage comprising a second tie rod coupling said arm of said pedal to said second slide collar.

* * * * *